United States Patent

Wachs

[15] 3,691,466

[45] Sept. 12, 1972

[54] PHASE DISTORTIONLESS LIMITER

[72] Inventor: Marvin Richard Wachs, Bowie, Md.

[73] Assignee: Communications Satellite Corp.

[22] Filed: Dec. 8, 1970

[21] Appl. No.: 96,121

[52] U.S. Cl. ..................325/347, 325/323, 325/349, 325/472, 328/162, 328/169, 328/173, 329/104, 329/110

[51] Int. Cl. ..............................................H04b 1/10

[58] Field of Search......325/322, 320, 347, 349, 472, 325/30, 323; 329/103, 110, 126, 128, 104; 332/18; 178/66; 328/169, 173, 195, 196, 206, 162

[56] References Cited

UNITED STATES PATENTS 3,307,112 2/1967 Clark.........................325/320

3,559,083 1/1971 Crouse......................329/128

3,426,151 2/1969 Tygart.......................325/349

*Primary Examiner*—Albert J. Mayer

*Attorney*—Sughrue, Rothwell, Mion, Zinn & Macpeak

[57] ABSTRACT

An FM limiter in which the FM signal is applied to a Schmitt trigger through a sample gate. The sampling time of the gate is controlled by a stable pulse generator. The output of the Schmitt trigger is sampled by a second gate and these samples are applied to a bistable multivibrator. The second gate is controlled by a delayed output from the stable pulse generator. The output of the bistable multivibrator is a frequency modulated square wave which is phase locked to the input FM wave form.

3 Claims, 4 Drawing Figures

INVENTOR
MARVIN WACHS

BY Sughrue, Rothwell, Mion,
Zinn & Macpeak
ATTORNEYS

PHASE DISTORTIONLESS LIMITER

BACKGROUND OF THE INVENTION

1. Field of the Invention

This invention relates to an IF amplitude limiter in an FM receiver, and more particularly, to an IF amplitude limiter which generates an FM square wave which is phase locked to the FM input wave form, thereby eliminating phase distortion found in prior art IF amplitude limiters.

2. Description of the Prior Art

IF amplitude limiting in an FM receiver is used to eliminate noise peaks or other variations that may be present in the amplitude of the received signal. In most prior art devices, the limiting is accomplished by applying the output of an IF amplifier to a device which has an amplitude saturation characteristic thereby clipping the peak amplitude of the noise as well as the FM signal. Since the transmitted information is contained in the frequency or phase variations of the receive signal rather than in amplitude variations, the limiting process does not directly affect the information transmitted.

Other prior art devices have used the output of the IF amplifier to trigger a multivibrator. The output from the multivibrator has a frequency controlled by the frequency of the modulated carrier wave and this output is then demodulated to yield an audio signal.

The main disadvantage of the prior art amplitude limiters is that these limiters cause phase distortion in the limiter output. This distortion is due to the fact, that because of imperfect FM modulators, there is some amplitude modulation of the transmitted FM signal as well as AM due to noise and further, that transmission deviations convert AM modulation into FM modulation. A more complete discussion of distortions caused by conventional amplitude limiters can be found in *Transmission Systems for Communications* published by Bell Telephone laboratories (1964) on pages 469–474.

SUMMARY OF THE INVENTION

In accordance with the method and apparatus of the instant invention, the output of an IF bandpass filter is sampled at a rate sufficient to convey the information contained therein according to known information sampling theory. This sample signal is used to operate a Schmitt trigger, which is responsive to the polarity of the samples above or below zero. Its output voltage is a voltage of fixed amplitude in the positive or negative direction in accordance with the polarity of the input signal. The output of the Schmitt trigger is sampled after having reached a steady state and these samples trigger a bi-stable multivibrator. Therefore, the output of the multivibrator is a variable frequency square wave of constant amplitude which is phase locked to the FM input signal.

DESCRIPTION OF THE PREFERRED EMBODIMENT

Figure 1:
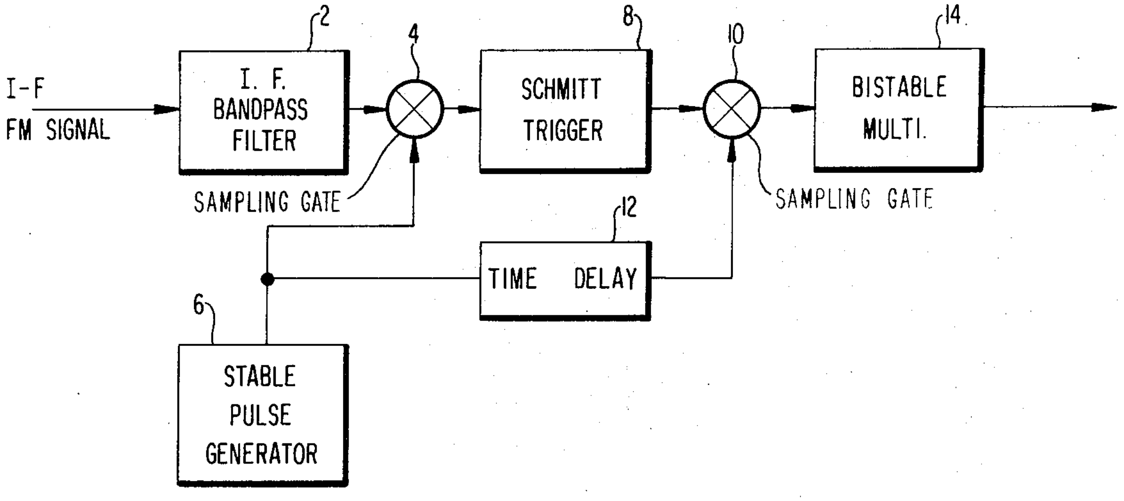
FIG. 1 is a block diagram of the preferred embodiment of this invention.

In FIG. 1 an IF FM signal is passed through IF bandpass filter 2 and applied to sample gate 4. The gate 4 is operated by a pulse generator 6 which generates pulses of short duration relative to the sampling interval. The rate of sampling is sufficient to convey the information according to known information sampling theory. In an article entitled "Communication in the Presence of Noise," by Claude E. Shannon, appearing in the January, 1949 issue of the Proceedings of the I.R.E., pp. 10–21, Shannon sets forth the following sampling theorem on page 11, "If a function $f(t)$ contains no frequencies higher than W cps, it is completely determined by giving its ordinates at a series of points spaced ½W seconds apart." Because of prior related work by Nyquist, Shannon defined the time interval ½W seconds as the Nyquist interval corresponding to the band W. See pg. 12 of Shannon's article. The output of gate 4 is applied to Schmitt trigger 8.

Figures 2A, 2B, 2C:
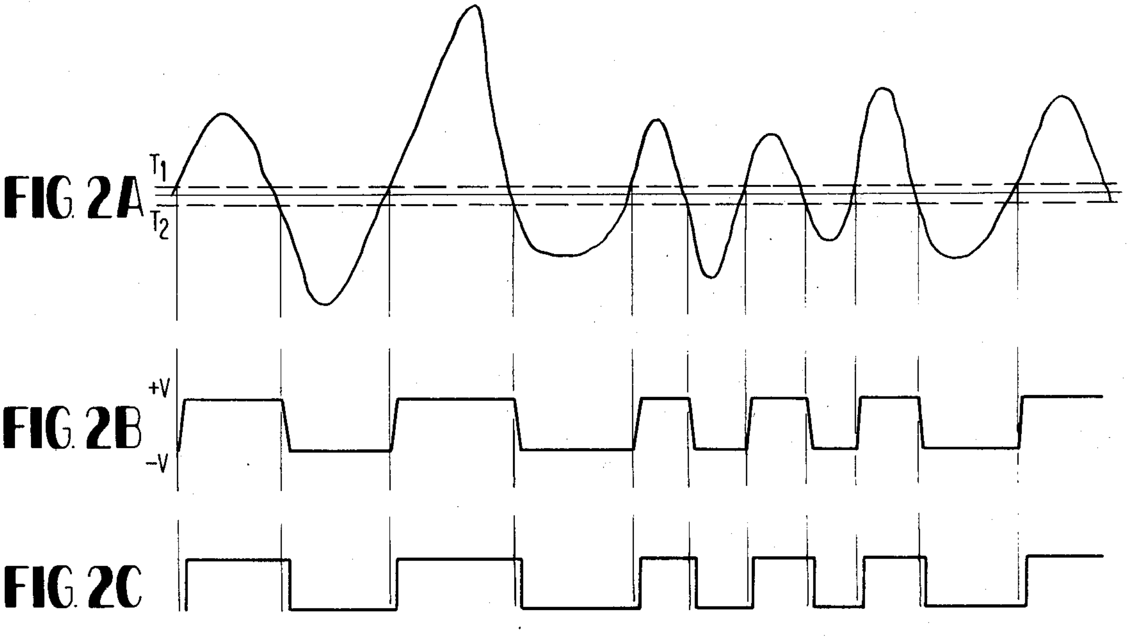
FIG. 2*a* shows a typical FM input signal.
FIG. 2*b* shows the output of a Schmitt trigger in response to the input signal of FIG. 2*a*.
FIG. 2*c* is the output of the multivibrator in the preferred embodiment of this invention.

A Schmitt trigger will produce a positive output voltage, +V, in response to an input voltage above a first predetermined threshold. The output will remain at +V until a voltage below a second predetermined threshold is applied to the input. The second predetermined threshold is below the first predetermined threshold because of the hysteresis effect inherent in Schmitt triggers. In Schmitt trigger 8, the first predetermined threshold is just above the 0 reference level of the input signal and the hysteresis is made small so that the second predetermined threshold is just below the 0 reference level of the input signal. These reference levels are shown as $T_1$ and $T_2$ respectively in FIG. 2*a*. Therefore, when the input signal is positive the output of the Schmitt trigger is +V and when the input signal passes through $T_2$ going negative, the output of the Schmitt trigger switches to −V. FIG. 2*b* is representative of the output of the Schmitt trigger 8 in response to an input signal shown in FIG. 2*a*. The output of the Schmitt trigger switches from −V to +V whenever the input signal shown in FIG. 2*a* passes through threshold $T_1$ going positive and switches from +V to −V when the input signal passes through threshold $T_2$ going negative.

The output of Schmitt trigger 8 is applied to sample gate 10 which is operated by pulses from pulse generator 6. The operating pulses from pulse generator 6 to gate 10 are delayed by a time delay 12 to insure that the output of Schmitt trigger 8 has reached its final value in response to triggering sample pulses from gate 4 before gate 10 operates. The output of gate 10 is applied to bistable multivibrator 14.

Bistable multivibrator 14 is a conventional flip-flop of the type which assumes one stable state in response to an input pulse of a first polarity and an opposite stable state in response to an input pulse of opposite polarity. Consequently, the state of the multivibrator 14 will only be changed in response to a first pulse in each series of consecutive input pulses of identical polarity. The resultant square wave output, shown in FIG. 2*c*, is in phase with the input intermediate frequency FM signal shown in FIG. 2*a*.

The rise time of the output of Schmitt trigger 8 is a function of the magnitude of the input signal. Therefore, when the input is sampled the magnitude of the input above +V or below −V will affect the rise time of the output of Schmitt trigger 8 as shown in FIG. 2*b*. The rise time of the output of bistable multivibrator 14 is constant due to the uniform amplitude of the samples applied thereto. Since the output of Schmitt trigger 8 is applied to the input of multivibrator 14 through gate 10 the output of the limiter does not have the variance in rise times of the individual pulses of the output of Schmitt trigger 8.

While the invention has been particularly shown and described with reference to the preferred embodiment thereof, it will be understood by those skilled in the art that various changes in form and details may be made therein without departing from the spirit and scope of the invention.

I claim:

1. A phase distortionless limiter comprising, a. input means adapted to receive an FM signal;

b. first sampling means connected to said input means for passing samples of said FM signal to an output thereof at a sampling rate equal to or greater than twice the frequency of the upper frequency to said FM signal, c. first bilevel signal means responsive to said samples for providing a first bilevel output signal which changes levels in response to a change in polarity of said samples applied thereto, provided said samples are greater in magnitude than a threshold value, d. second sampling means connected to said first bilevel signal means for passing samples of said first bilevel signal to an output thereof at the same sample rate of said first sampling means but delayed therefrom a period of time less than the time between samples but great enough to ensure that said first bilevel signal is not sampled during the switchover time from one level to the other level, and e. second bilevel signal means responsive to the samples from said second sampling means for providing a second bilevel output signal which changes levels in response to a change in polarity of said samples applied thereto.

2. A phase distortionless limiter as claimed in claim 1 wherein said first bilevel signal means is a Schmitt trigger and said second bilevel signal means is a bistable multivibrator.

3. A phase distortionless limiter as claimed in claim 2 wherein said first sampling means comprises a first sampling gate adapted to receive said FM signal and sampling pulses, said second sampling gate adapted to receive said first bilevel signal and sampling pulses, and further comprising a sampling pulse generator and a time delay means, the output of said sampling pulse generator being connected directly to said first sampling gate and through said time delay means to said second sampling gate.

* * * * *